United States Patent
Kakura

(10) Patent No.: US 10,034,248 B2
(45) Date of Patent: Jul. 24, 2018

(54) TIME PATTERN OF TRANSMISSION POWER IN CELL GROUP USING SAME FREQUENCY BAND

(71) Applicant: NEC Corporation, Tokyo (JP)

(72) Inventor: Yoshikazu Kakura, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 15/022,455

(22) PCT Filed: May 30, 2014

(86) PCT No.: PCT/JP2014/002880
§ 371 (c)(1),
(2) Date: Mar. 16, 2016

(87) PCT Pub. No.: WO2015/045216
PCT Pub. Date: Apr. 2, 2015

(65) Prior Publication Data
US 2016/0227487 A1     Aug. 4, 2016

(30) Foreign Application Priority Data
Sep. 24, 2013    (JP) ................................ 2013-196728

(51) Int. Cl.
*H04W 52/22*      (2009.01)
*H04W 16/32*      (2009.01)
(Continued)

(52) U.S. Cl.
CPC ......... *H04W 52/22* (2013.01); *H04W 52/223* (2013.01); *H04W 52/243* (2013.01); *H04W 16/32* (2013.01); *H04W 48/20* (2013.01)

(58) Field of Classification Search
CPC ..... H04W 16/32; H04W 48/20; H04W 52/22; H04W 52/223; H04W 52/243
(Continued)

(56) References Cited

U.S. PATENT DOCUMENTS

| 2008/0070585 A1* | 3/2008 | Wu | ........................ H04W 52/34 |
|---|---|---|---|
|  |  |  | 455/452.2 |
| 2016/0112994 A1* | 4/2016 | Wang | ..................... H04L 5/0048 |
|  |  |  | 370/329 |

FOREIGN PATENT DOCUMENTS

| JP | 2010-504054 A | 2/2010 |
|---|---|---|
| JP | 2011-514039 A | 4/2011 |
| WO | WO-2008/034061 A1 | 3/2008 |

OTHER PUBLICATIONS

3GPP TS36.300 v10.4.0 (Jun. 2011) Overall description Stage 2 (Release 10) (194 pages).
(Continued)

*Primary Examiner* — Philip Sobutka
(74) *Attorney, Agent, or Firm* — Wilmer Cutler Pickering Hale and Dorr LLP

(57) ABSTRACT

Provided is a control apparatus that can improve throughput of a cell edge user while preventing the throughput of the cell edge user. A control apparatus (10) according to the present invention is disposed in a radio system including communication areas formed by a plurality of cells using the same frequency band. The control apparatus (10) includes a pattern determining unit (110) for defining a cell group including one or more cells formed by radio stations (1) to (6) and determining a time pattern of transmission power to be set for each of a plurality of the cell groups and a communication unit (120) for notifying the radio stations (1) to (6) that form the cells included in the cell group of the time patterns of the transmission power and timing signals indicating switching timings of the transmission power in the radio stations (1) to (6).

14 Claims, 20 Drawing Sheets

(51) Int. Cl.
 *H04W 52/24* (2009.01)
 *H04W 48/20* (2009.01)
(58) Field of Classification Search
 USPC .......................................................... 455/522
 See application file for complete search history.

(56) References Cited

OTHER PUBLICATIONS

International Search Report corresponding to PCT/JP2014/002880 dated Aug. 26, 2014 (one page).

* cited by examiner

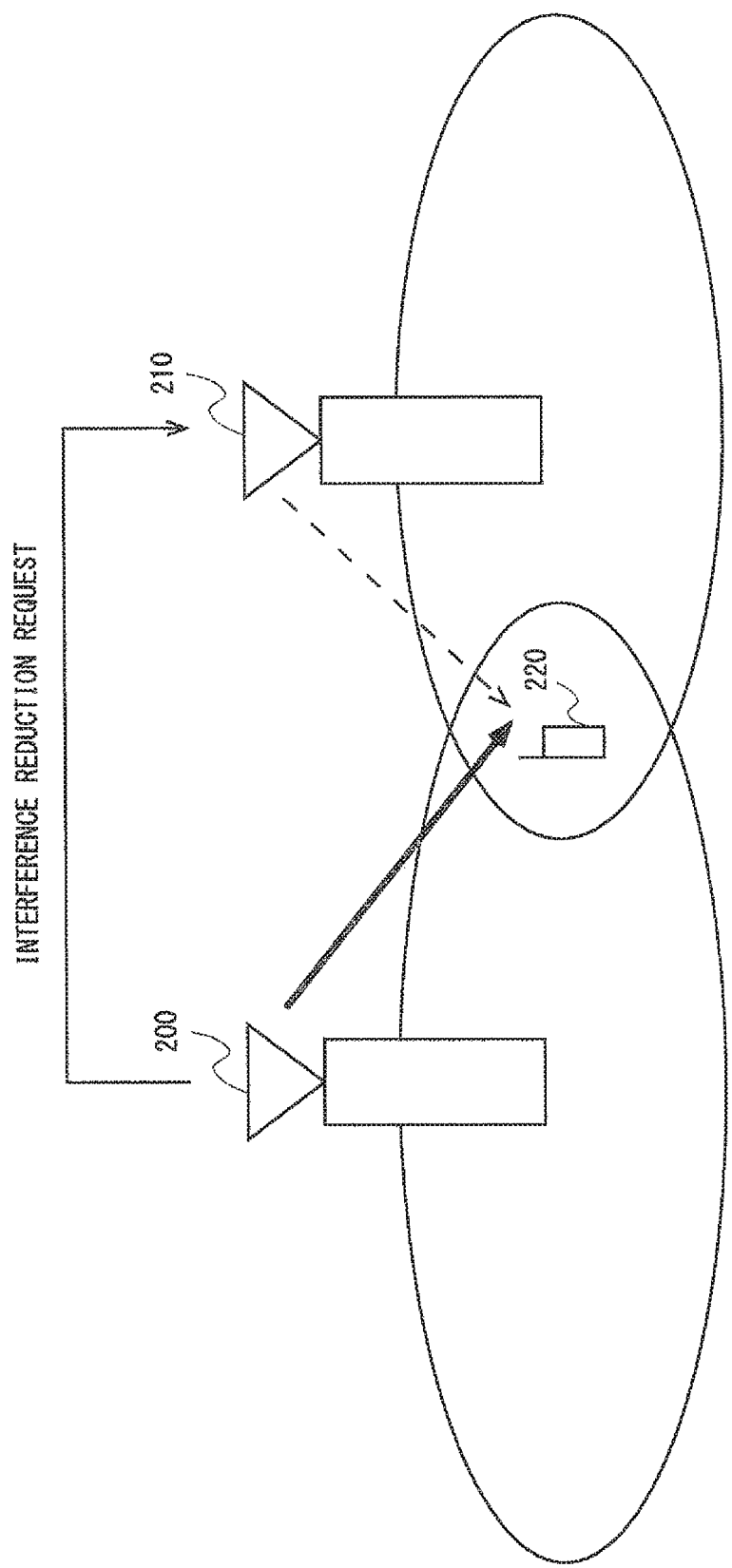

TIME PATTERN OF TRANSMISSION POWER IN CELL GROUP USING SAME FREQUENCY BAND

CROSS-REFERENCE TO RELATED APPLICATIONS

This application is a national stage application of International Application No. PCT/JP2014/002880 entitled "Control Apparatus, Radio Station, Radio Terminal, Radio System, Control Method, and Non-Transitory Computer Readable Medium" filed on May 30, 2014, which claims priority to Japanese Application No. 2013-196728 filed on Sep. 24, 2013, the disclosures of which are hereby incorporated by reference in their entirety.

TECHNICAL FIELD

The present invention relates to a control apparatus and, in particular, to a control apparatus having a plurality of cells that use the same frequency band.

BACKGROUND ART

In a mobile communication system, there is a known method for forming communication areas using a plurality of cells that use the same frequency in order to effectively use limited frequencies. LTE (Long Term Evolution) by 3GPP (3rd Generation Partnership Project) disclosed in Non Patent Literature 1 and the like employ this method.

On the other hand, with a cell configuration where the same frequency is used for a plurality of cells, there is large interference from an adjacent cell in a boundary region between the cells. Therefore, quality of reception signals in a radio terminal remarkably deteriorates. In particular, reception signal quality of a static terminal and a low-speed mobile terminal may be stationary or becomes low for a long time. A method for restricting resource allocation in adjacent cells has been investigated as a method for reducing such interference between cells. Hereinafter, an inter-cell interference reduction method disclosed in Patent Literature 1 will be explained.

As shown in FIG. 20, a radio station 200 sends a request for reducing interference on a resource which will be used to a radio station 210 that is an interfering source on the radio resource which will be used. The radio station 210 which has received the request for reducing the interference restricts usage of the radio resource at the same time and in the same frequency in order to reduce the interference on the corresponding radio resource. By doing so, the interference on a radio terminal 220 from the radio station 210 in the boundary region between the cells can be reduced.

CITATION LIST

Patent Literature

Patent Literature 1: Published Japanese Translation of PCT International Publication for Patent Application, No. 2011-514039

Non Patent Literature

Non Patent Literature 1: 3GPP TS36.300 v10.4.0 (2011 June) Overall description Stage 2 (Release 10)

SUMMARY OF INVENTION

Technical Problem

In the inter-cell interference reduction method disclosed in Patent Literature 1, a restriction is imposed on the allocation of the radio resource in the adjacent cells in order to improve communication quality of the radio terminals at the cell boundaries. When this method is employed, chances of radio resource allocation to the radio terminals belonging to the adjacent cells are reduced. It is necessary to increase an amount of the radio resource which will be restricted from being allocated in the adjacent cells in order to greatly improve communication quality of the radio terminals at the cell boundaries. However, when the amount of the radio resource which will be restricted from being allocated in the adjacent cells is increased, throughput of the radio terminals belonging to the adjacent cells may greatly deteriorate.

On the other hand, when the amount of the radio resource which will be restricted from being allocated in the adjacent cells is reduced, improvement in the communication quality of the radio terminals at the cell boundaries will be limited.

An object of the present invention is to improve throughput of a cell edge user while preventing the throughput of the cell edge user from deteriorating in order to solve the above problem.

Solution to Problem

A first exemplary embodiment of the present invention is a control apparatus disposed in a radio system including communication areas formed a plurality of cells using the same frequency band. The control apparatus includes: pattern determining means for defining a cell group and determining a time pattern of transmission power, in which the cell group includes one or more cells formed by a radio station, and the time pattern of the transmission power is set for each of a plurality of the cell groups; and communication means for notifying the radio station of the time pattern of the transmission power and a timing signal indicating a switching timing of the transmission power in the radio station, in which the radio station forms the cell included in the cell group.

A second exemplary embodiment of the present invention is a radio station disposed in a radio system including communication areas formed a plurality of cells using the same frequency band. The radio station includes: pattern determining means for defining a cell group and determining a time pattern of transmission power, in which the cell group includes one or more cells formed by another radio station, and the time pattern of the transmission power is set for each of a plurality of the cell groups; and communication means for notifying the other radio station of the time pattern of the transmission power and a timing signal indicating a switching timing of the transmission power in the other radio station, in which the other radio station forms the cell included in the cell group.

A third exemplary aspect of the present invention is a radio terminal disposed in a radio system including communication areas formed by a plurality of cells using the same frequency band. The radio terminal executes a switching process of cells with which the radio terminal communicate before and after transmission power is switched in a radio station according to a time pattern of the transmission power and a timing signal in a cell group including one or more cells formed by the radio station, in which the time pattern of the transmission power is set for each of a plurality of the cell groups determined by a control apparatus, and the timing signal indicates a switching timing of the transmission power in the radio station.

A fourth exemplary aspect of the present invention is a radio system including communication areas formed by a plurality of cells using the same frequency band. The radio system includes: a control apparatus including: pattern determining means for defining a cell group and determining a time pattern of transmission power, in which the cell group includes one or more cells formed by a radio station, and the time pattern of the transmission power is set for each of a plurality of the cell groups; and communication means for notifying the radio station of the time pattern of the transmission power and a timing signal indicating a switching timing of the transmission power in the radio station, in which the radio station forms the cell included in the cell group; a radio station that switches transmission power of a signal according to the time pattern of the transmission power and the timing signal that have been sent in a cell formed by the radio station, in which the signal is sent to a camping cell; and a radio terminal that executes a switching process of a cell with which the radio terminal communicates before and after the switching of the transmission power when the transmission power of the signal sent from the radio station is switched.

A fifth exemplary aspect of the present invention is a control method used by a control apparatus disposed in a radio system including communication areas formed by a plurality of cells using the same frequency band. The control method includes: defining a cell group and determining a time pattern of transmission power, in which the cell group includes one or more cells formed by a radio station, the time pattern of the transmission power is set for each of a plurality of the cell groups; and notifying the radio station of the time pattern of the transmission power and a timing signal indicating a switching timing of the transmission power in the radio station, in which the radio station forms the cell included in the cell group.

A sixth exemplary aspect of the present invention is a program that causes a computer of a control apparatus disposed in a radio system including communication areas formed by a plurality of cells using the same frequency band to execute processes of: defining a cell group and determining a time pattern of transmission power, in which the cell group includes one or more cells formed by a radio station, and the time pattern of the transmission power is set for each of a plurality of the cell groups; and notifying the radio station of the time pattern of the transmission power and a timing signal indicating a switching timing of the transmission power in the radio station, in which the radio station forms the cell included in the cell group.

Advantageous Effects of Invention

According to the present invention, it is possible to provide a control apparatus, a radio station, a radio terminal, a radio system, a control method, and a program that can improve throughput of a cell edge user while preventing the throughput of the cell edge user from deteriorating.

BRIEF DESCRIPTION OF DRAWINGS

FIG. 20 is a drawing for explaining an inter-cell interference reduction method disclosed in Patent Literature 1.

DESCRIPTION OF EMBODIMENTS

First Exemplary Embodiment

Hereinafter, exemplary embodiments of the present invention will be explained with reference to the drawings. Firstly, a configuration example of a communication system according to a first exemplary embodiment of the present invention will be explained by referring to FIG. 1. A communication system shown in FIG. 1 includes a control apparatus 10 and radio stations 1 to 6. The control apparatus 10 is connected to the radio stations 1 to 6. The radio stations 1 to 6 each form cells indicating areas with which the respective radio stations can communicate. The cells formed by the radio stations 1 to 6 use the same frequency band. Each cell is formed to overlap with a part of the adjacent cell. A part where the cells overlap may be referred to as a cell edge or a cell boundary.

Next, a configuration example of the control apparatus 10 will be explained. The control apparatus 10 includes a pattern determining unit 110 and a communication unit 120.

Figure 1:
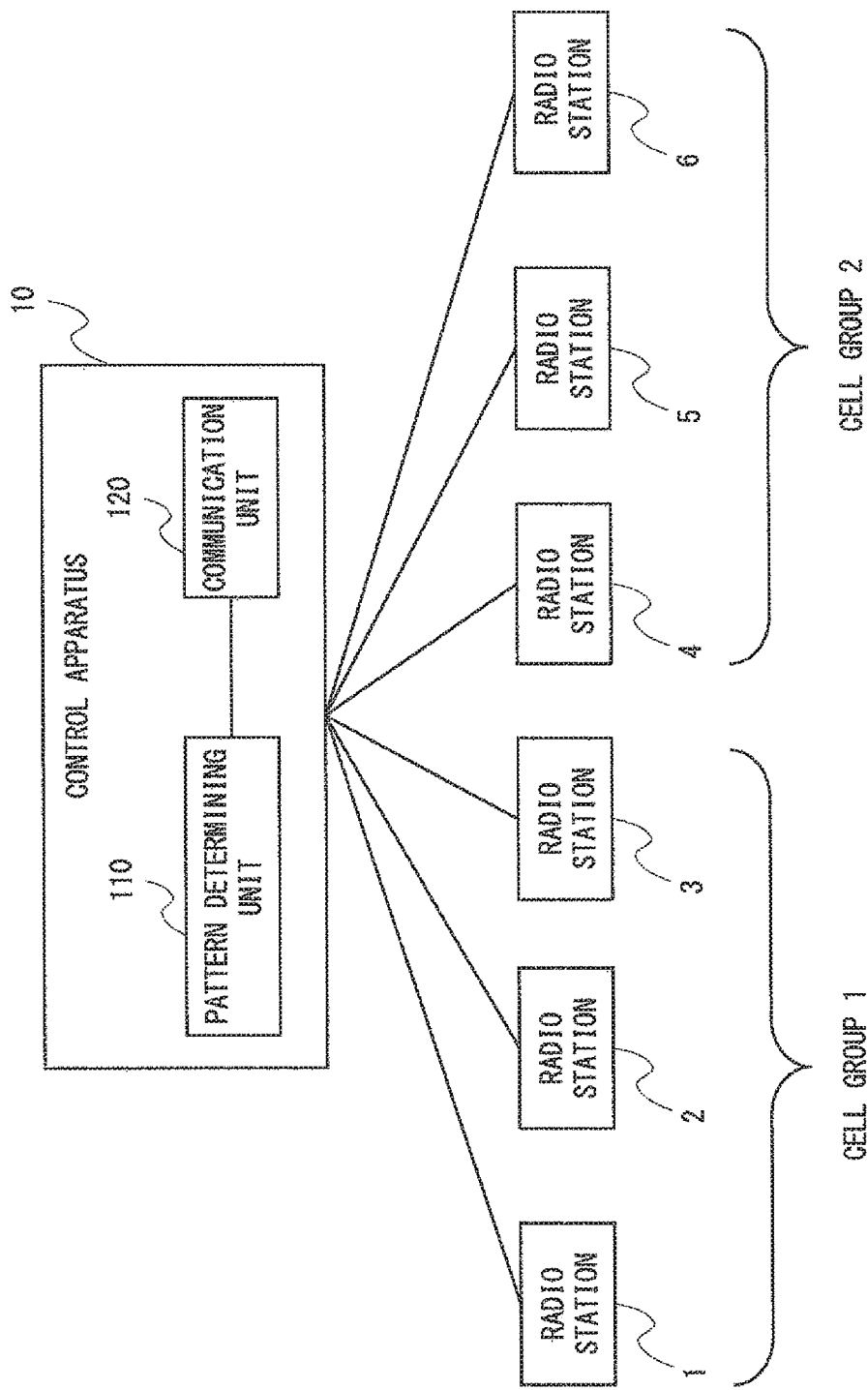
FIG. 1 is a block diagram of a communication system according to a first exemplary embodiment.

The pattern determining unit 110 defines a cell group including one or more cells that are formed by the radio stations 1 to 6. FIG. 1 shows an example in which the cells formed by the radio stations 1 to 3 are defined as a cell group 1 and the cells formed by the radio stations 4 to 6 are defined as a cell group 2. A configuration of the cell groups in this drawing is merely an example, and for example, the cell groups may be configured such that the cell formed by the radio station 1 may be defined as the cell group 1, and the cells formed by other radio stations may be defined as the cell group 2. Further, three or more cell groups may be defined.

Moreover, the pattern determining unit 110 determines a time pattern of transmission power which will be set for each cell group. The time pattern of the transmission power is information indicating a value of the transmission power used by the radio stations belonging to the cell groups for each predetermined switching cycle. The pattern determining unit 11 may determine, as the time patterns of the transmission power, for example, (1, 0, 1, 0 . . . ) for the cell group 1 and (0, 1, 0, 1 . . . ) for the cell group 2. In the time patterns of the transmission power, "1" indicates maximum transmission power, while "0" indicates a transmission stop. For example, (1, 0, 1, 0 . . . ) indicates that the maximum transmission power and the transmission stop is repeatedly set for each predetermined cycle.

The communication unit 120 notifies the radio stations 1 to 6 of the time patterns of the transmission power determined by the pattern determining unit 110 and timing signals indicating switching timings of the transmission power in the radio stations 1 to 6. The switching timing signals may be, for example, signals to which the switching cycles for the radio stations 1 to 6 to switch the values of the transmission power have been set. In this case, the communication unit 12 may notify the radio stations 1 to 6 of the switching timing signals indicating the switching cycles only once or may notify the radio stations 1 to 6 of the switching timing signals at each certain period. The switching timing signals that are sent only once or periodically from the control apparatus 10 to the radio stations 1 to 6 may also be referred to as switching cycle signals.

Alternatively, the switching timing signals may be signals sent non-periodically from the control apparatus 10 to the radio stations 1 to 6. In this case, the radio stations 1 to 6 may switch the transmission power at timings when the radio stations 1 to 6 receive the switching timing signals sent from the control apparatus 10. That is, the control apparatus 10 sends the switching timing signals to the radio stations 1 to 6 at arbitrary timings. The signals sent non-periodically from the control apparatus 10 to the radio stations 1 to 6 may be referred to as trigger signals.

When the radio stations 1 to 6 receive the time patterns and the switching timing signals of the transmission power, the radio stations 1 to 6 change the transmission power according to the time patterns and the switching timings of the transmission power. As the radio stations 1 to 6 change the transmission power, a radio terminal that has been connected to any one of the radio stations 1 to 6 changes the radio station to which the radio terminal will be connected. That is, when the radio station to which the radio terminal is currently connected stops the transmission power or changes the value of the transmission power to a small value, the radio terminal is connected to another radio station so as to continue communication. At this time, a position of the radio terminal in the cell changes when the radio terminal changes the radio station to which the radio terminal is connected. When the radio terminal changes the radio station to which the radio terminal is connected, a position on which the radio terminal camps may change from the cell edge to a center of the cell.

As has been explained above, the transmission power of the radio station can be controlled by each cell group using a radio system of FIG. 1. When the transmission power of the radio station is changed for each cell group, the radio terminal can change the radio station to which the radio station is connected. This enables a particular radio terminal to avoid being always positioned at the cell edge, thereby improving throughput of a radio terminal positioned at the cell edge in a certain cell.

Figure 2:
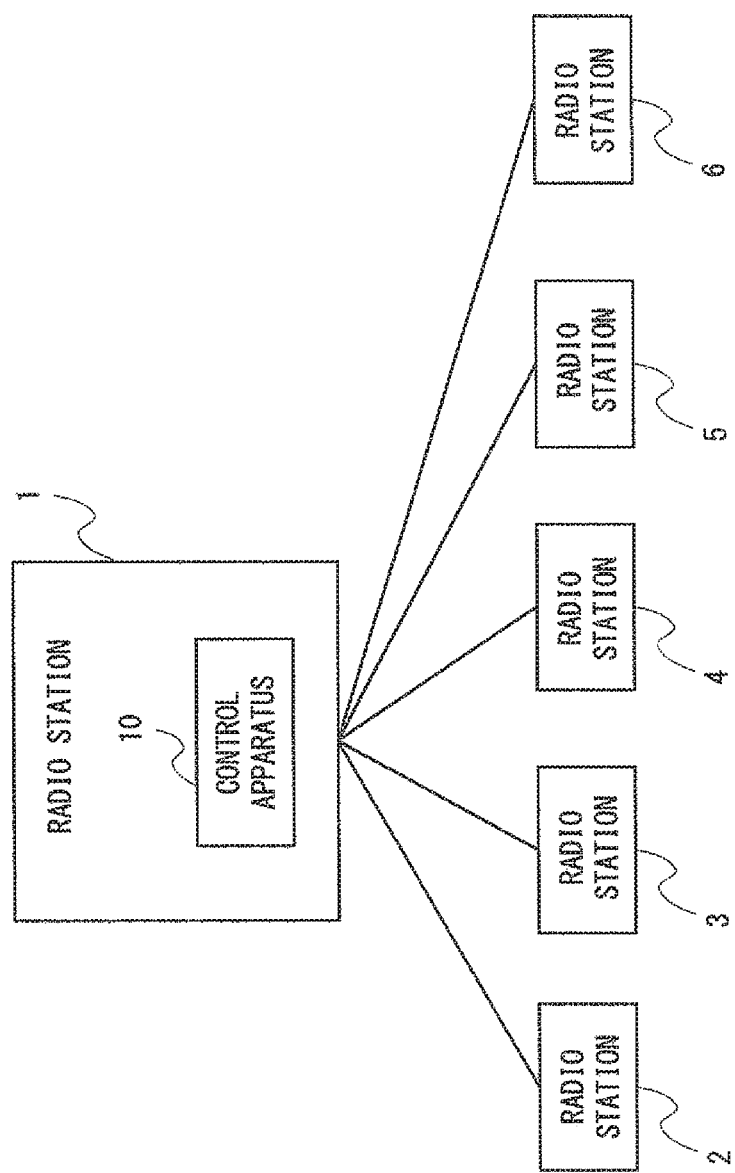
FIG. 2 is a block diagram of the communication system according to the first exemplary embodiment.
Figure 3:
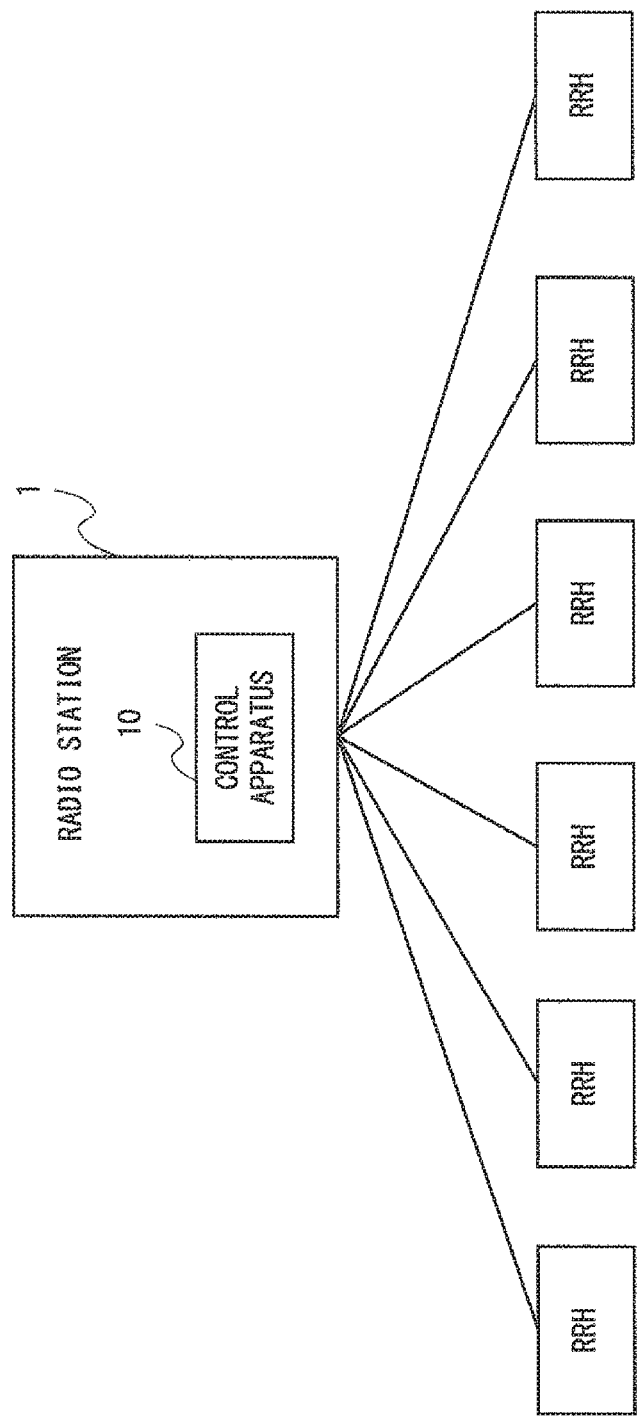
FIG. 3 is a block diagram of the communication system according to the first exemplary embodiment.

Further, although FIG. 1 shows an example in which the control apparatus 10 is disposed at an upper level of the radio stations 1 to 6, and each radio station forms the cell, a configuration shown in FIG. 2 in which the control apparatus 10 is disposed in the radio station, and the control apparatus 10 notifies the radio stations of the time patterns and the switching cycles of the transmission power using an interface between the radio stations may be possible. Further, as shown in FIG. 3, functions of the radio stations including the control apparatus are concentrated in one place, and Remote Radio Heads (RRHs) each comprised of an RF unit and an amplifier may form the cells. In this case, the control apparatus may notify the RRHs of the time patterns of the transmission power and the switching cycles of the transmission power, or the control apparatus may directly switch the transmission power of the RRHs.

Second Exemplary Embodiment

Next, an arrangement example of base stations according to a second exemplary embodiment of the present invention will be explained by referring to FIG. 4. In this drawing, #11 indicates a place where a base station 11 is positioned. This applies to #12 to #16. Moreover, the base station corresponds to the radio station in FIG. 1. Further, the base station 11 forms a cell 21, a base station 12 forms a cell 22, a base station 13 forms a cell 23, a base station 14 forms a cell 24, a base station 15 forms a cell 25, and a base station 16 forms a cell 26. Although FIG. 4 shows a state in which adjacent cells are formed to be in contact with each other for an easier explanation, the adjacent cells may overlap in practice.

The base stations 11 to 13 belong to a cell group 1, and the base stations 14 to 16 belong to a cell group 2. In FIG. 4, the cells formed by the base stations belonging to the cell group 1 are indicated by solid lines, and the cells formed by the base stations belonging to the cell group 2 are indicated by dashed lines. FIG. 4 shows that the transmission power of the base stations 11 to 13 belonging to the cell group 1 is the maximum transmission power, and the base stations 14 to 16 belonging to the cell group 2 have stopped the transmission. At this time, a radio terminal 50 is positioned at a cell edge of the cell 21 and connected to the base station 11.

Figure 5:
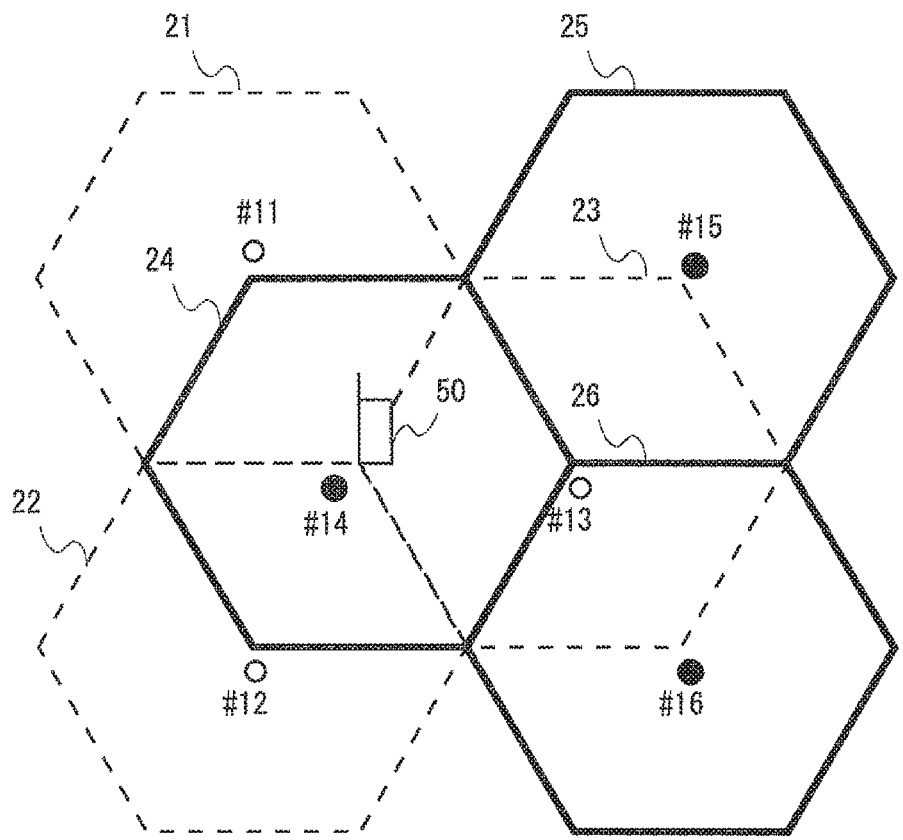
FIG. 5 is a drawing showing an arrangement of the cells according to the second exemplary embodiment.

Next, FIG. 5 shows a state in which the base stations 11 to 13 belonging to the cell group 1 have stopped the transmission, and the transmission power of the base stations 14 to 16 belonging to the cell group 2 is changed to the maximum transmission power according to the time patterns of the transmission power. In FIG. 5, the cells formed by the base stations belonging to the cell group 1 are indicated by dashed lines, and the cells formed by the base stations belonging to the cell group 2 are indicated by solid lines. At this time, the radio terminal 50 changes a connection destination from the base station 11 to the base station 14. Further, the radio terminal 50 is positioned near a center of the cell 24.

Figure 4:
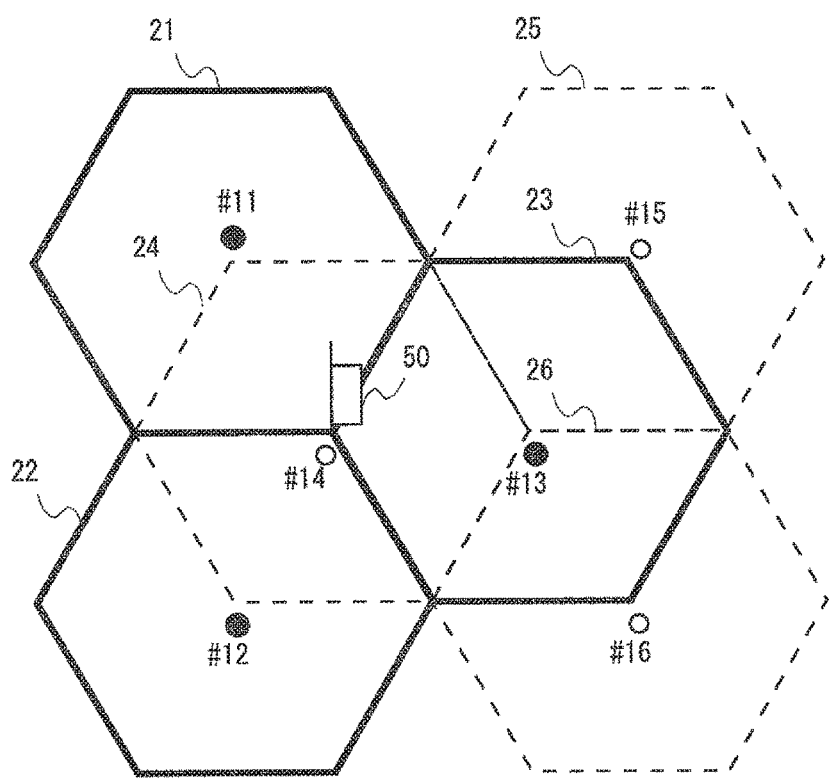
FIG. 4 is a drawing showing an arrangement of cells according to a second exemplary embodiment.

FIGS. 4 and 5 show that when the transmission power of the cell groups 1 and 2 changes, the position of the radio terminal 50 is changed from the cell edge of the cell 21 to near the center of the cell 24. In the following explanation, although it may be explained that the radio terminal is connected to the cell, this indicates a content similar to that the radio terminal is connected to the base station that forms the cell.

Figure 6:
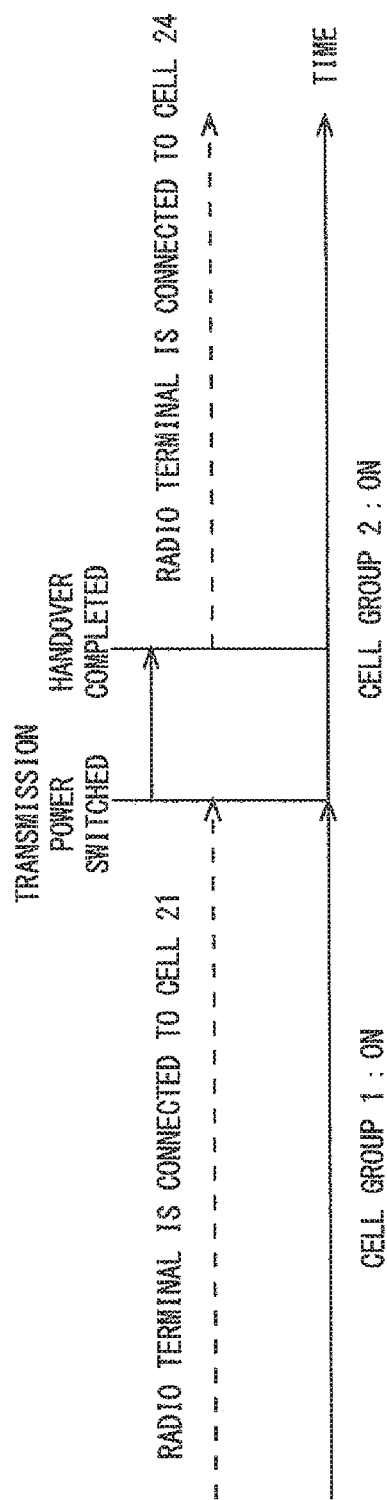
FIG. 6 is a drawing for explaining switching of transmission power according to the second exemplary embodiment.

Next, an example of switching the transmission power according to a second exemplary embodiment will be explained by referring to FIG. 6. FIG. 6 shows an example in which the cell group 1 is switched from "1 (the maximum transmission power)" to "0 (transmission stop)", and the cell group 2 is switched from "0" to "1". Before the switching, only the transmission power of each base station belonging to the cell group 1 is in an ON state, and the radio terminal 50 is connected to the cell 21. At this time, the radio terminal 50 is positioned at a cell boundary of the cells 21 to 23, and reception signal quality is low. When the time pattern of the transmission power is switched at the switching cycle, the transmission power of each base station belonging to the cell group 1 becomes an OFF state, and only the transmission power of the cell group 2 will become the ON state. As the radio terminal 50 is disconnected from the cell 21, the radio terminal 50 selects the cell 24 from the cell group 2 and is connected to the cell 24. That is, the radio terminal 50 performs handover from the cell 21 to the cell 24. The radio terminal 50 is positioned at the center of the cell 24 and has high reception signal quality.

As described so far, the periodical switching of the transmission power according to the pattern independently for each cell group can prevent a particular terminal from being always at the cell edge, thereby improving cell edge throughput.

Figure 7:
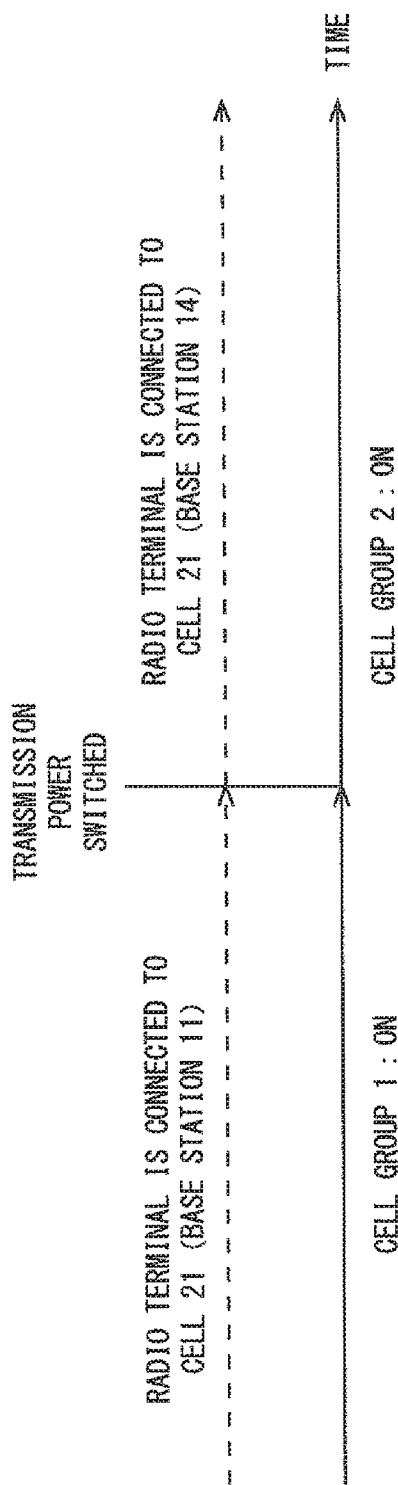
FIG. 7 is a drawing for explaining the switching of the transmission power according to the second exemplary embodiment.

In the example of FIG. 6, although an example in which the connection of the radio terminal 50 is switched from the cell 21 to the cell 24 has been shown, a configuration shown in FIG. 7 in which the base station 14 has the same cell identifier as that of the base station 11 enables the radio terminal 50 to switch the transmission power without switching the cell to which the radio terminal 50 is connected.

Note that in this exemplary embodiment, the time pattern of the transmission power has been explained as being a combination of "1" and "0", a value between the maximum transmission power and the transmission stop can be used.

Third Exemplary Embodiment

In a third exemplary embodiment, a case of performing carrier aggregation in which a radio terminal simultaneously uses cells using a plurality of frequency bands and is connected to a plurality of base stations will be explained. Further, in the third exemplary embodiment, an example in which the same switching of the transmission power as that explained in the first and second exemplary embodiment is applied to only secondary cells that are added in association with a primary cell to which a radio terminal is firstly connected.

Figure 8:
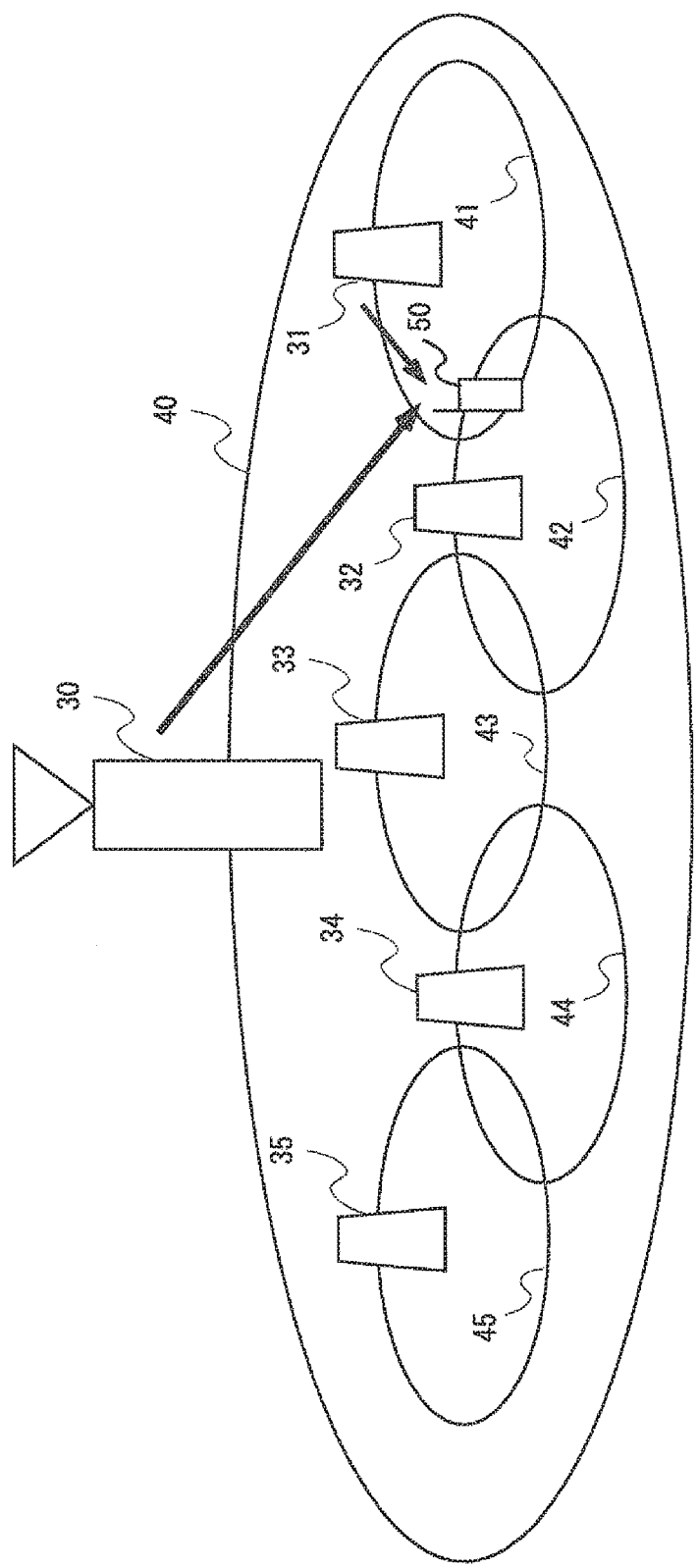
FIG. 8 is a drawing showing an arrangement of cells when carrier aggregation according to a third exemplary embodiment is carried out.

FIG. 8 is a drawing showing an example of the carrier aggregation in which the radio terminal 50 is connected to a plurality of base stations using cells that use a plurality of frequency bands. A macro base station 30 that covers a wide area uses a frequency A, and small base stations 31 to 35 that cover narrow areas (small cells 41 to 45) inside a coverage area (a macro cell 40) of the macro base station 30 use a frequency B. The radio terminal 50 is firstly connected to the macro base station 30 as a primary cell. Next, the radio terminal 50 is connected to any one of the small base stations 31 to 35 as the secondary cell in association with the primary cell. The carrier aggregation uses the macro cell 40 having a small number of times for handover as the primary cell and uses the small cells 41 to 45 as the secondary cells. In this drawing, it is shown that the small cell 41 is used as the secondary cell. The macro cell 40 is notified of mobile management information, real-time data and the like that requires immediacy. The small cells 41 to 45 may be notified of FTP (File Transfer Protocol) data that does not relatively require immediacy.

An example in which the small cells 41 to 45 are used as the secondary cells, and the switching of the transmission power is used only for these secondary cells in a configuration shown in FIG. 8 will be explained below.

Figure 9:
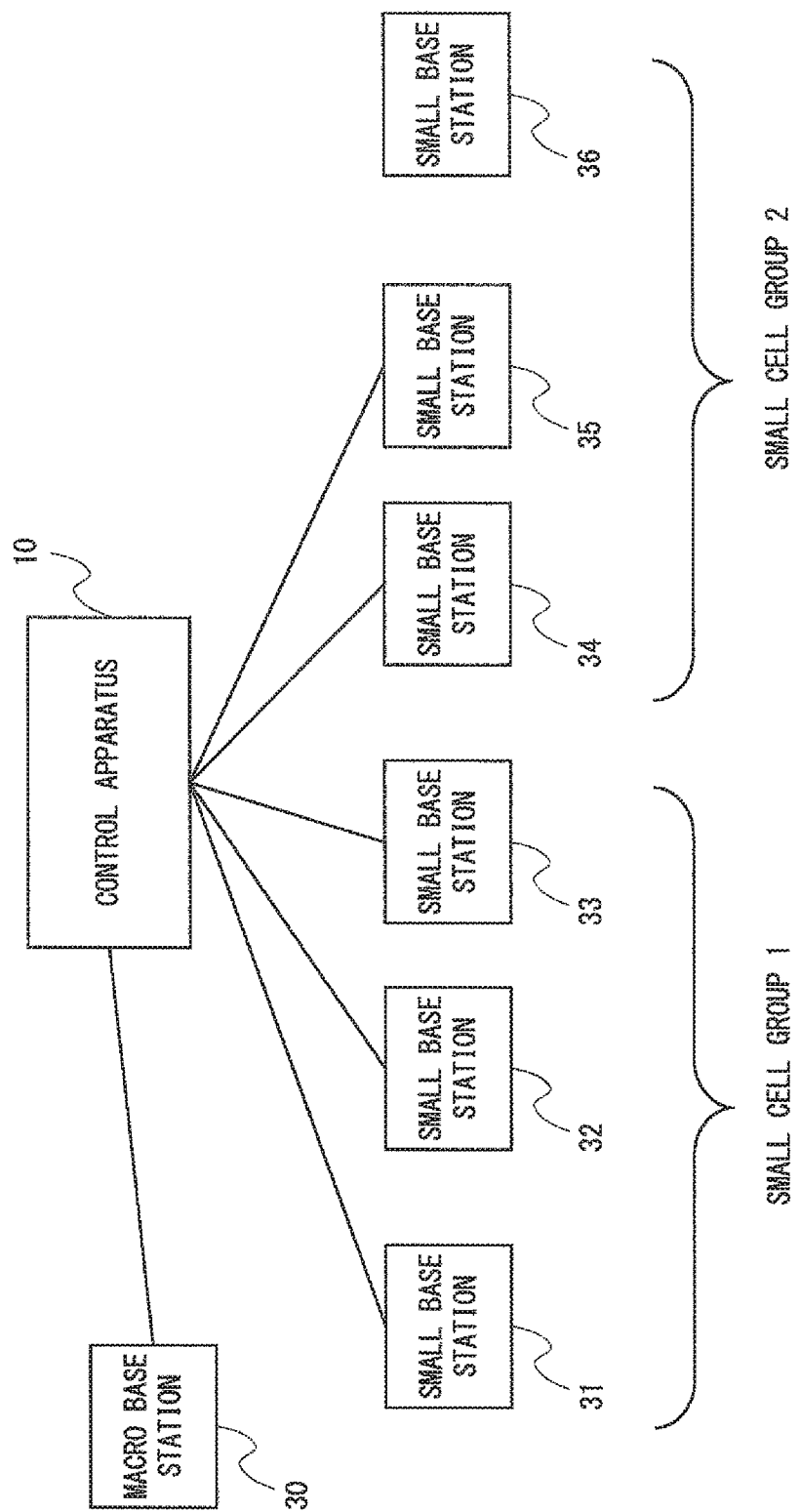
FIG. 9 is a block diagram of a communication system according to a third exemplary embodiment.

In FIG. 9, the control apparatus 10 is connected to the macro base station 30 and the small base stations 31 to 36. In this drawing, the small base stations 31 to 33 are defined as a small cell group 1, and the small base stations 34 to 36 are defined as a small cell group 2.

Figure 10:
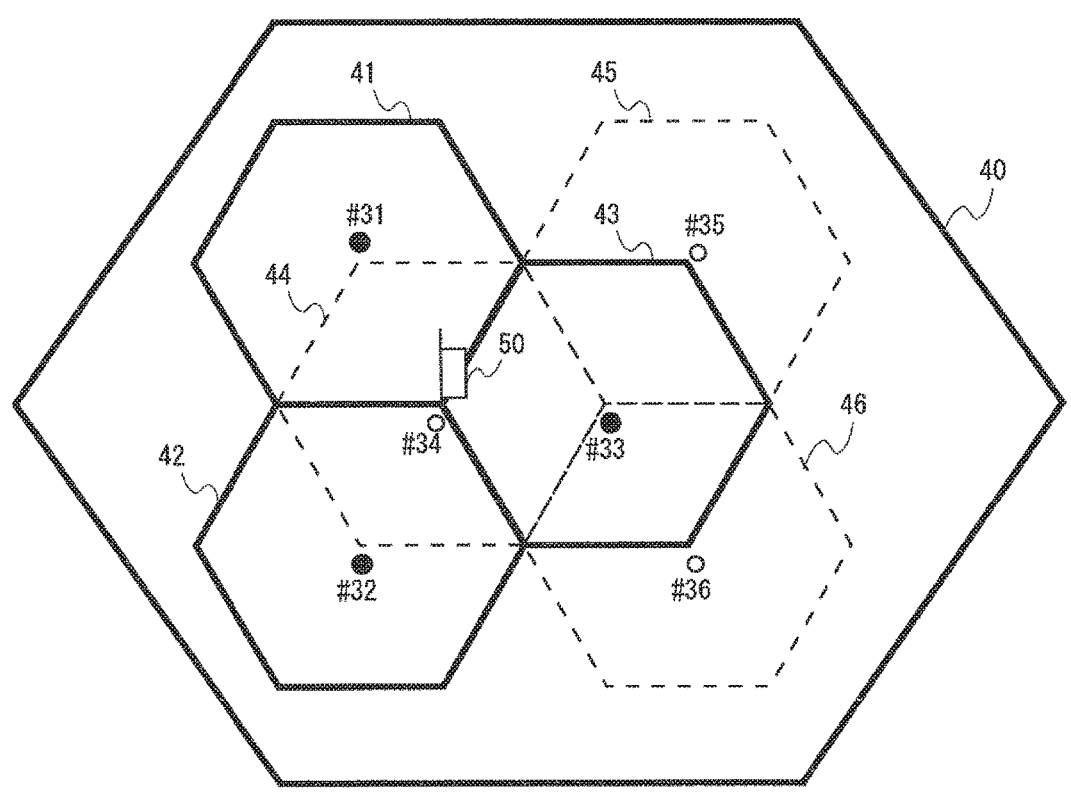
FIG. 10 is a drawing showing an arrangement of cells according to a third exemplary embodiment.
Figure 11:
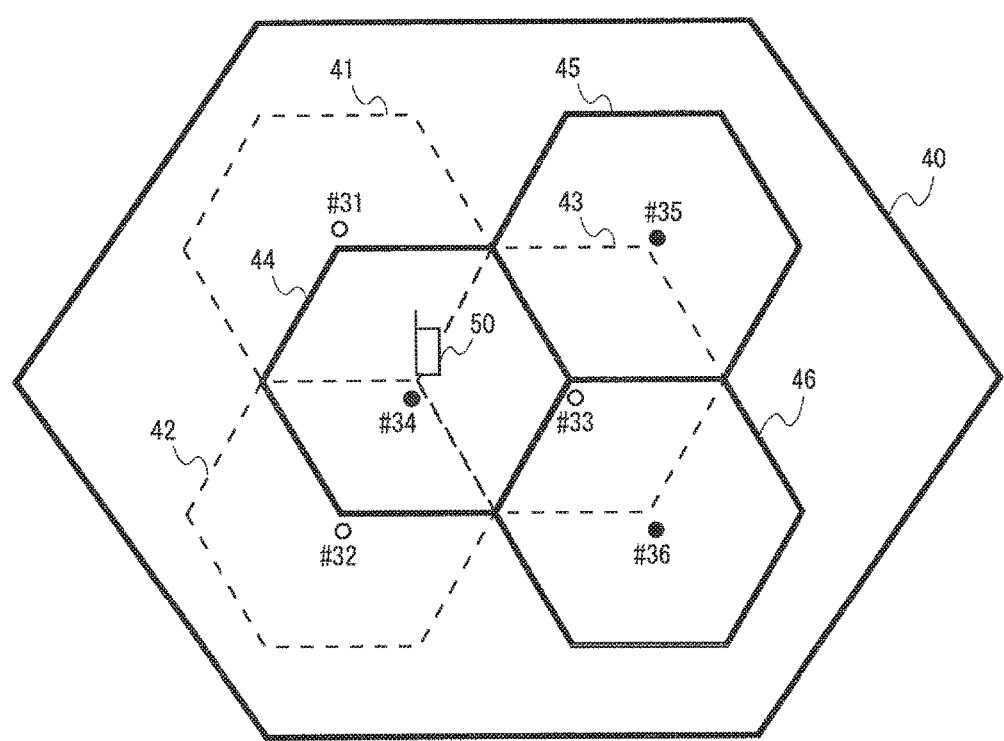
FIG. 11 is a drawing showing the arrangement of the cells according to the third exemplary embodiment.

FIGS. 10 and 11 show arrangement examples of the small base stations 31 to 36 according to the third exemplary embodiment of the present invention. In FIGS. 10 and 11, the base stations shown in FIGS. 4 and 5 are changed to the small base stations. Further, cells formed by the small base stations are arranged inside the macro cell 40 that is formed by the macro base station 30. As other configurations and contents in FIGS. 10 and 11 are similar to those in FIGS. 4 and 5, a detailed explanation will be omitted.

The control apparatus 10 may determine, as the time patterns of the transmission power, for example, (1, 0, 1, 0 . . . ) for the small cell group 1 and (0, 1, 0, 1 . . . ) for the small cell group 2 and determines the switching cycles as being ten seconds. The control apparatus 10 has notified the small base stations 31 to 36 of the time patterns and the switching cycles of the transmission power. Note that in the time patterns of the transmission power, "1" indicates the maximum transmission power, while "0" indicates the transmission stop.

Figure 12:
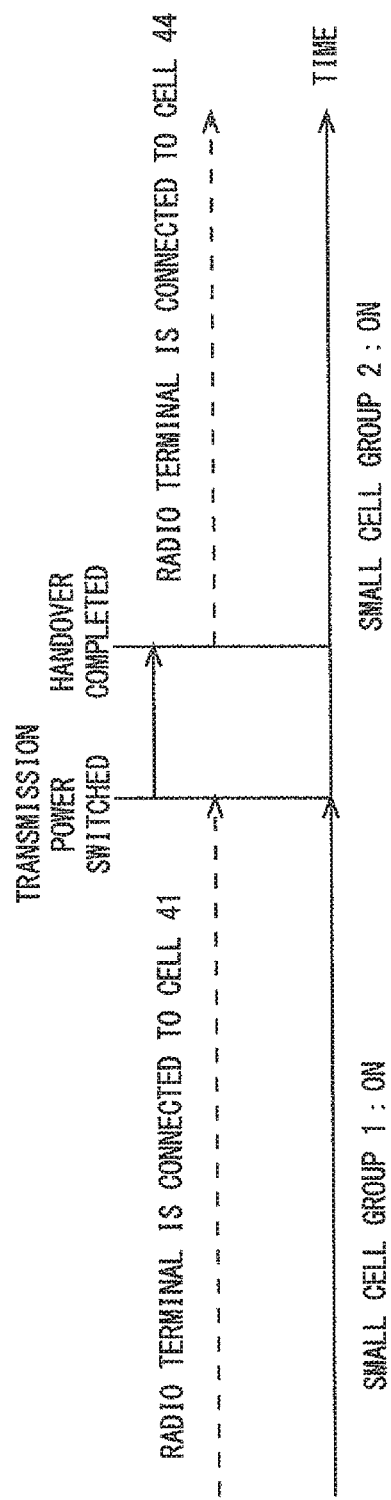
FIG. 12 is a drawing for explaining switching of the transmission power according to the third exemplary embodiment.

Next, an example of switching the transmission power according to the third exemplary embodiment will be explained by referring to FIG. 12. FIG. 12 shows an example in which the small cell group 1 is switched from "1" to "0", and the small cell group 2 is switched from "0" to "1".

Before the switching, only the transmission power of the small cell group 1 is in the ON state, and the radio terminal 50 selects the small cell 41 as the secondary cell. At this time, the radio terminal 50 is positioned at a cell boundary of the small cells 41 to 43, and the reception signal quality is low. When the time pattern of the transmission power is switched at the switching cycle, the transmission power of the small cell group 1 becomes the OFF state, and only the transmission power of the small cell group 2 will become the ON state. As the radio terminal 50 is disconnected from the small cell 41, the radio terminal 50 selects the small cell 44 from the small cell group 2 as the secondary cell and is connected to the cell 44. The radio terminal 50 is positioned at a center of the small cell 44 and has high reception signal quality. There is no switching of the primary cell in the meantime.

As described so far, by the use of the small cells as the secondary cells and the periodical switching of the transmission power according to the pattern independently for each small cell group, it is possible to prevent a particular terminal from being always at the cell edge in the secondary cells without affecting connectivity of the primary cell, thereby improving the cell edge throughput.

Further, FIG. 9 shows an example in which the control apparatus 10 is disposed at an upper level of the macro base station 30 and the small base stations 31 to 36, and each radio station forms the cell. On the other hand, a configuration in which the control apparatus 10 is disposed in the macro radio station 30, and the control apparatus 10 notifies the radio stations of the time patterns and the switching cycles of the transmission power using an interface between the radio stations may be possible. Further, functions of the base stations including the control apparatus 10 are concentrated in one place, and Remote Radio Heads (RRHs) each comprised of an RF unit and an amplifier may form the cells.

Fourth Exemplary Embodiment

In a fourth exemplary embodiment of the present invention, an example in which the radio terminal 50 belongs to a plurality of cells using the same frequency band in different cell groups will be explained. The control apparatus 10 notifies each base station of the time pattern of the transmission power. Each base station switches the transmission power for each sub-frame in accordance with the time pattern of the transmission power. An example in which the radio terminal 50 switches the cell to communicate for each sub-frame according to a cell pattern that is the time pattern of the cell having the maximum transmission power in the cell group is explained.

A connection relation between the control apparatus 10 and the base stations 11 to 16 is configured in a manner similar to that shown in FIG. 1 except that the radio stations 1 to 6 in FIG. 1 are replaced by the base stations 11 to 16. Further, the base stations 11 to 16 are arranged in a manner similar to those shown in FIGS. 4 and 5.

Figure 13:
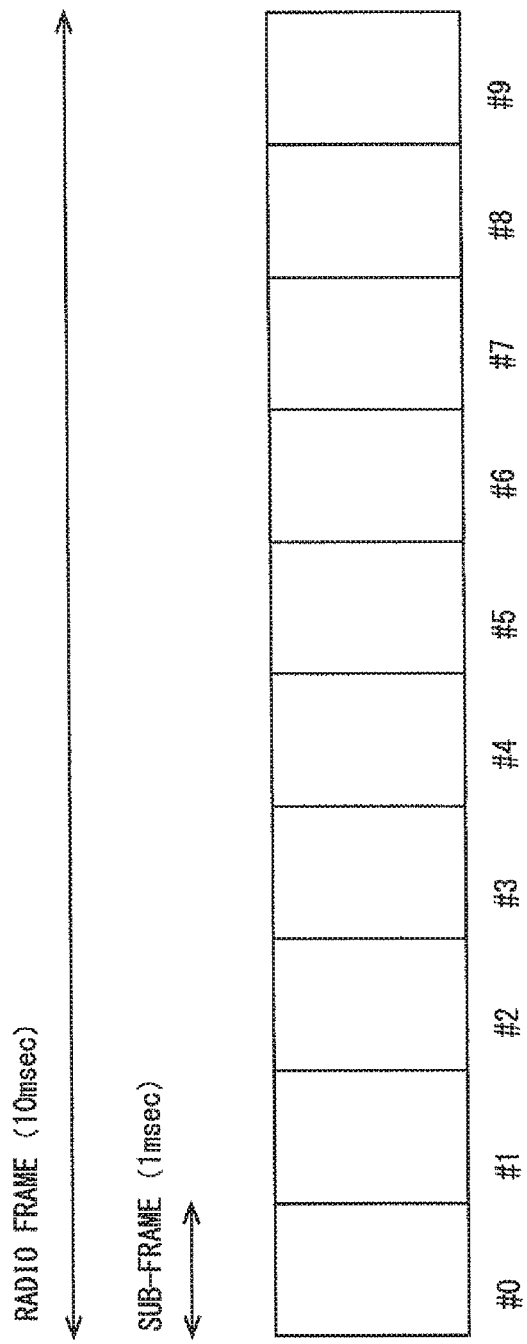
FIG. 13 is a drawing showing a radio frame according to a fourth exemplary embodiment.

The control apparatus 10 determines, as the time patterns of the transmission power, (1, 0, 1, 0, 1, 0, 1, 0, 1, 0) for the cell group 1 and (0, 1, 0, 1, 0, 1, 0, 1, 0, 1) for the cell group 2 and determines the switching cycle as being a sub-frame cycle (1 m sec). The control apparatus 10 notifies the base stations 11 to 16 of the time patterns and the switching cycles of the transmission power. Note that in the time patterns of the transmission power, "1" indicates the maximum transmission power, while "0" indicates the transmission stop. For example, a configuration of FIG. 13 that is used in LTE is used as a radio frame. One radio sub-frame is comprised of ten sub-frames each having 1 msec length. The time pattern of the transmission power which is (1, 0, 1, 0, 1, 0, 1, 0, 1, 0) indicates, in order from the left, a value to be applied to a sub-frame 1, a value to be applied to a sub-frame 2, and the rightmost value indicates a value to be applied to a sub-frame 10.

Figure 14:
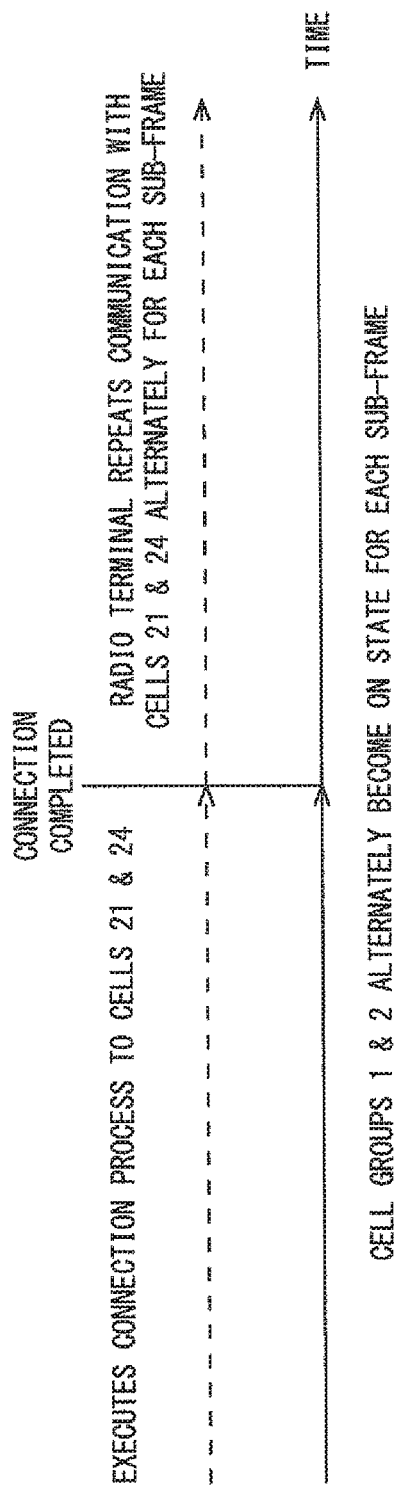
FIG. 14 is a drawing for explaining switching of transmission power according to the fourth exemplary embodiment.

FIG. 14 shows an example in which the radio terminal 50 is connected to the cell 21 in the cell group 1 and the cell 24 in the cell group 2 at the same time and alternately repeats communication with the cell 21 and the cell 24 for each sub-frame. The switching of the communication cells by the radio terminal 50 can be realized by, for example, the control apparatus 10 explicitly notifying the terminal of a pattern of the communication cells (#21, #24, #21, #24, #21, #24, #21, #24, #21, #24). The pattern of the communication cells (#21, #24, #21, #24, #21, #24, #21, #24, #21, #24) indicates the cells having the maximum transmission power for each sub-frame. For example, in the sub-frame 1, the transmission power of the cell 21 is the maximum, and in the sub-frame 2, the transmission power of the cell 24 is the maximum. This applies to the sub-frame 3 and subsequent sub-frames. The pattern of the communication cells indicates the cell to be connected for each sub-frame. In the pattern of the communication cells, #21 indicates the cell 21, and #24 indicates the cell 24.

Alternatively, the control apparatus 10 notifies the radio terminal 50 of a cell group pattern (#1, #2, #1, #2, #1, #2, #1, #2, #1, #2) that is the time pattern of the cell group having the maximum transmission power in the cell group, a cell group 1=(cell 21, cell 22, cell 23) and a cell group 2=(cell 24, cell 25, cell 26) which are cell group information. In the cell group pattern, #1 and #2 indicate the cell groups 1 and 2, respectively.

The radio terminal 50 can recognize, for example, the cell group having the maximum transmission power in the sub-frame 1 is the cell group 1, and the cell group 1 includes the cells 21 to 23. Therefore, for example, in the sub-frame 1, the radio terminal 50 may select the cell having the maximum received power from the cells 21 to 23 and be connected to the selected cell.

Figure 15:
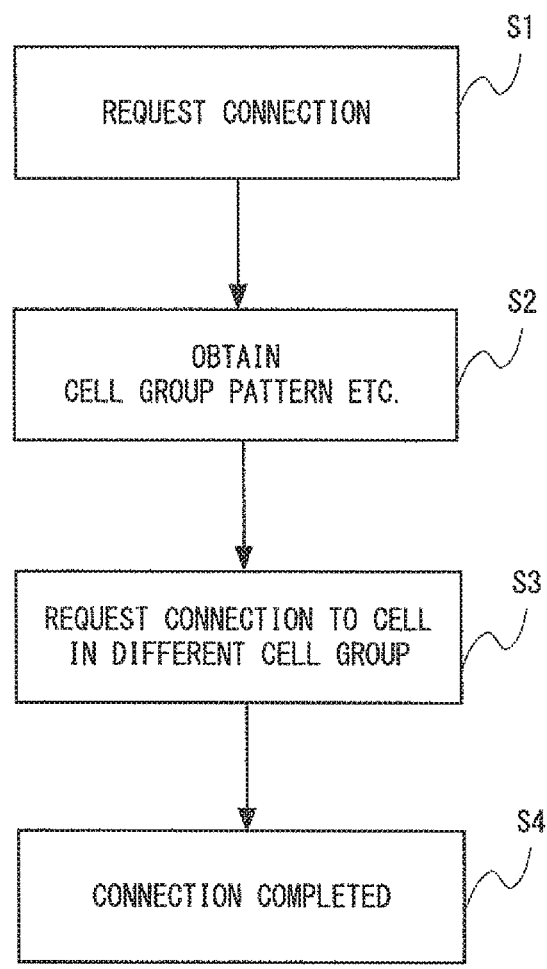
FIG. 15 is a drawing showing a flow of a connection process to a cell according to the fourth exemplary embodiment.

In this way, when the connected cell is determined, the pattern of the communication cells is uniquely determined. Therefore, when the control apparatus 10 notifies the radio terminal 50 of the cell group pattern and the cell group information, it is not necessary for the control apparatus 10 to explicitly notify the radio terminal 50 of the pattern of the communication cells. An example of a procedure in which the radio terminal 50 is connected to a plurality of cells will be explained by referring to FIG. 15.

Step 1: The radio terminal 50 selects an optimum cell according to an average value of measurement values of received power for each cell over a plurality of radio frames and issues a connection request to the base station.

Step 2: When the connection request is accepted and the radio terminal 50 is connected to the cell, the radio terminal 50 obtains the cell group pattern and the cell group information from the base station via the connected cell.

Step 3: When there is a cell group included in the cell group pattern other than the cell group to which the currently connected cell belongs, and further, the received power of one of the cells in the cell group exceeds a threshold, the radio terminal 50 requests a connection to the cell. If there is no such cell group, the connection process is ended.

Step 4: When the connection request in the step 3 is accepted, the radio terminal 50 adds the cell to which the radio terminal 50 will be connected.

The radio terminal 50 can be connected to the plurality of cells by the above processes. The radio terminal 50 can be connected to three or more cells by repeating the steps 3 and 4.

As described above, when the radio terminal 50 belongs to the plurality of cells using the same frequency band in different cell groups and periodically switches the communication cells according to the time pattern of the communication cells which the radio terminal 50 has been notified by the base station, high-speed switching of the communication cells is possible. This prevents a particular terminal from being always at the cell edge without generating switching delay, thereby improving the cell edge throughput.

Note that a configuration in which the switching of the transmission power that is similar to the one explained in the fourth exemplary embodiment is applied only to the secondary cells in FIG. 8 is possible.

Fifth Exemplary Embodiment

In a fifth exemplary embodiment, an example in which the control apparatus 10 notifies each base station of the time pattern of the transmission power and the switching cycle of the transmission power, and when each base station switches the transmission power in accordance with the time pattern and the switching cycle of the transmission power, the cell group and the time pattern of the transmission power are changed using feedback information from the radio terminal 50 will be explained.

A connection relation between the control apparatus 10 and each base station is configured in a manner similar to those shown in FIG. 1 except that the radio stations 1 to 6 in FIG. 1 are replaced by the base stations 11 to 16. Further, the base stations 11 to 16 are arranged in a manner similar to those shown in FIGS. 16 and 17.

The control apparatus 10 determines, as the time patterns of the transmission power, (1, 0, 1, 0, 1, 0 ... ) for the cell group 1 and (0, 1, 0, 1, 0, 1 ... ) for the cell group 2 and determines the switching cycle as being ten seconds. The control apparatus 10 notifies the base stations 11 to 16 of the time patterns and the switching cycles of the transmission power. Note that in the time patterns of the transmission power, "1" indicates the maximum transmission power, while "0" indicates the transmission stop.

Figure 18:
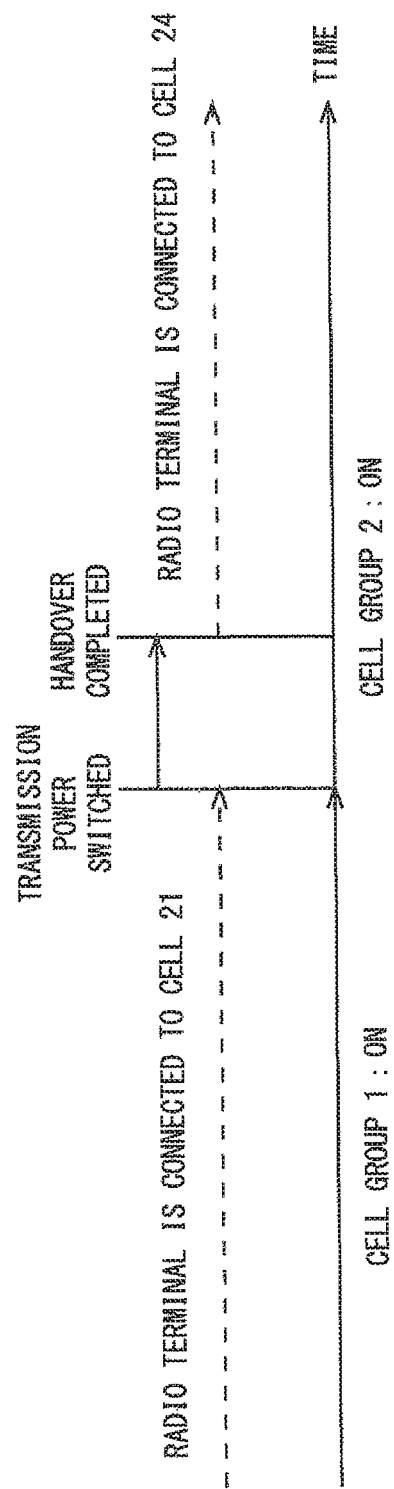
FIG. 18 is a drawing for explaining switching of transmission power according to the fifth exemplary embodiment.

FIG. 18 shows an example in which the cell group 1 is switched from "1" to "0", and the cell group 2 is switched from "0" to "1". Before the switching, only the transmission power of the cell group 1 is in the ON state, and the radio terminal 50 is connected to the cell 21. At this time, the radio terminal 50 is positioned at a cell boundary of the cells 21 to 23 and receives strong adjacent interference power from the cells 22 and 23. Thus, the reception signal quality of the radio terminal 50 in the cell 21 is low. When the time pattern of the transmission power is switched at the switching cycle, the transmission power of the cell group 1 becomes the OFF state, and only the transmission power of the cell group will become the ON state.

Figure 19:
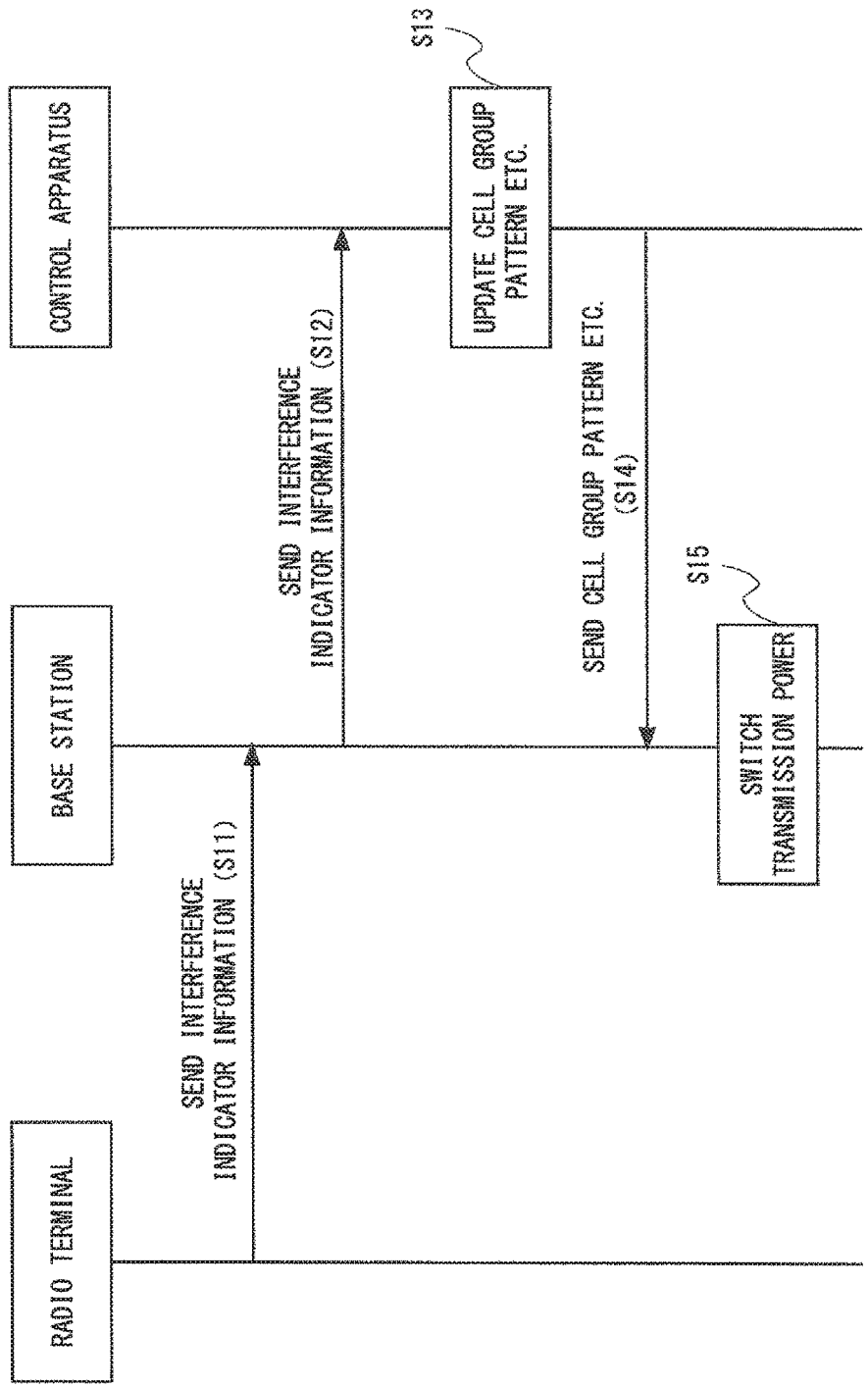
FIG. 19 is a drawing showing a flow of a feedback control process according to the fifth exemplary embodiment.

As the radio terminal 50 is disconnected from the cell 21, the radio terminal 50 selects the cell 24 from the cell group 2 and is connected to the cell 24. The radio terminal 50 is positioned at a cell boundary of the cells 24 to 26 and receives strong adjacent interference power from the cells 25 and 26. Accordingly, the reception signal quality after the radio terminal 50 switches the transmission power in the cell 24 is low. In such a case, the cell group and the time pattern of the transmission power is switched by feedback from the radio terminal 50. A flow of processes of feedback control will be explained by referring to FIG. 19.

Step S11: The radio terminal 50 uses a difference between the average value of the measurement values of the received power for each cell over the plurality of radio frames and the received power of the currently connected cell as an "indicator regarding interference from an adjacent cell". When the radio terminal 50 detects a cell having this value that is less than or equal to a threshold, the radio terminal 50 notifies the base station of a corresponding cell identifier as "information regarding the interference from the adjacent cell".

Step S12: The base station notifies the control apparatus 10 of the "information regarding the interference from the adjacent cell" which has been sent from the radio terminal 50.

Step S13: The control apparatus 10 updates the cell group, the time pattern of the transmission power and the like in order to improve the received quality of the radio terminal 50 that has sent the notification of the "information regarding the interference from the adjacent cell".

Step S14: The control apparatus 10 notifies the base station of the cell group, the time pattern of the transmission power and the like that have been changed.

Step S15: The base station switches the transmission power according to the time pattern of the transmission power included in the notification for the cell belonging to the cell group included in the notification.

Figure 16:
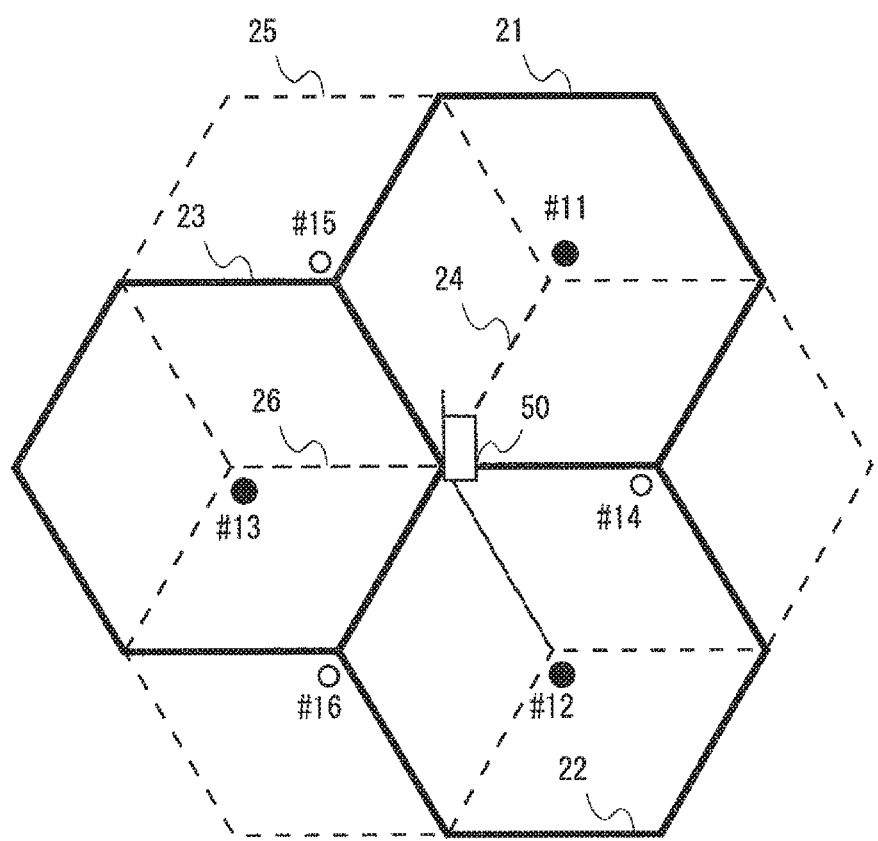
FIG. 16 is a drawing showing an arrangement of cells according to a fifth exemplary embodiment.
Figure 17:
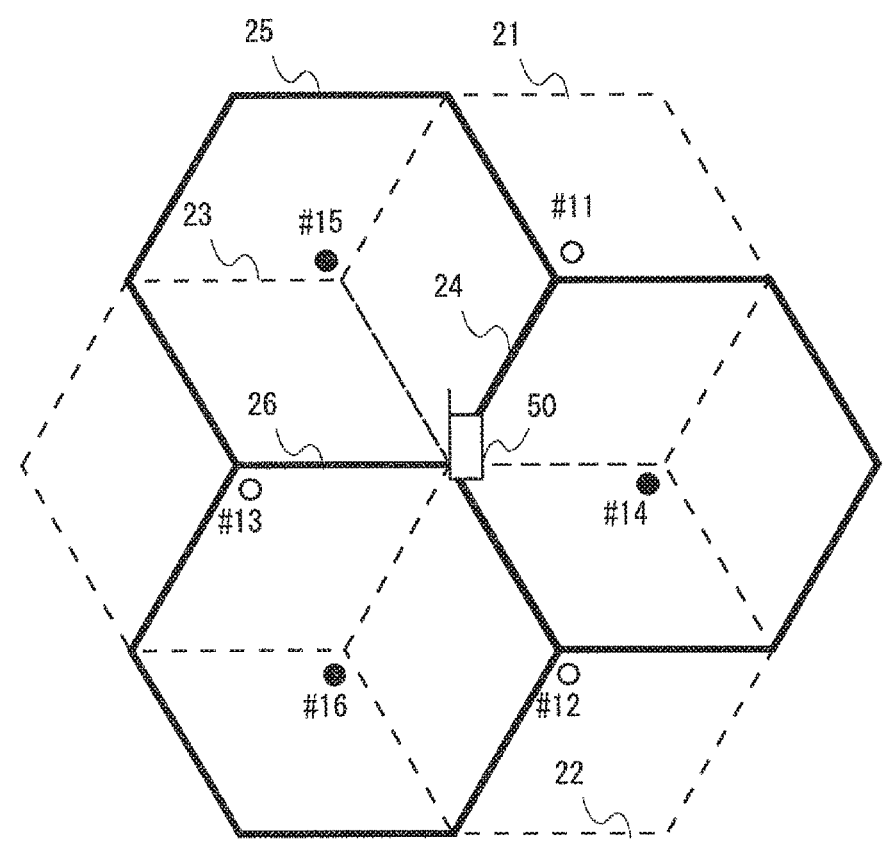
FIG. 17 is a drawing showing the arrangement of the cells according to the fifth exemplary embodiment.

In the radio terminal 50 shown in FIGS. 16 and 17, for example, the received power of the cells 21 to 26 is 10 dBm, 9 dBm, 8 dBm, 10 dBm, 8 dB, and 7 dBm, respectively, and the threshold used in the step 11 is 2 dB. When the radio terminal 50 is connected to the cell 21, the "indicators regarding the interference from the adjacent cell" for the cells 22 and 23 are 1 dB and 2 dB, respectively. On the other hand, when the terminal is connected to the cell 24, "the indicators regarding the interference from the adjacent cell" for the cells 25 and 26 are 2 dB and 3 dB, respectively. Accordingly, the terminal notifies the base station of cell identifiers of the cells 22, 23, and 25 having the "indicators regarding the interference from the adjacent cell" being less than or equal to 2 dB as the "information regarding the interference from the adjacent cell".

The control apparatus 10 which has received the notification from the base station deletes the cell 23 from the cell group 21 so that it will become the cell group 1=(cell 21, cell 22) and deletes the cell 25 from the cell group 2 so that it will become the cell group 2=(cell 24, cell 26). Further, the control apparatus 10 newly adds the cell group 3=(cell 23, cell 25). Then, the control apparatus 10 changes the time patterns of the transmission power of the cell groups 1, 2, and 3 to (1, 0, 0, 1, 0, 0), (0, 1, 0, 0, 1, 0), and (0, 0, 1, 0, 0, 1), respectively.

When each base station switches the transmission power according to the cell group and the time pattern of the transmission power which the control apparatus 10 has sent a notification of, the interference from the cell 23 is reduced when the transmission power of the cell group 1 is in the ON state, and the interference from the cell 25 is reduced when the transmission power of the cell group 2 is in the ON state.

As mentioned above, the cell group and the time pattern of the transmission power are changed by the feedback information sent from the radio terminal 50 in order to improve the cell edge throughput.

Further, in the step S11, the radio terminal 50 uses the difference between the average value of the measurement values of the received power for each cell over the plurality of radio frames and the received power of the currently connected cell as the "indicator regarding the interference from the adjacent cell". For example, when the received power of the currently connected cell is low, even when interference power of the adjacent cell is low, the "indicator regarding the interference from the adjacent cell" could fall below the threshold. Therefore, when the received power of the currently connected cell is greater than a predetermined value, and further, the "indicator regarding the interference from the adjacent cell" falls below the threshold, the radio terminal 50 may send the "information regarding the interference from the adjacent cell" to the control apparatus 10 via the base station.

In the above example, although both of the cell group and the time pattern of the transmission power are changed, for example, by changing the cell groups such that the cell group 1=(cell 21, cell 22) and the cell group 2=(cell 23, cell 24, cell 25, cell 26), the interference when the transmission power of the cell group 1 is in the ON state can be reduced.

Note that, for example, downstream Reference signal (RS) received power (RS Received Power: RSRP) that is defined in LTE may be used for the received power used to calculate the "indicator regarding the interference from the adjacent cell". In the above example, although the difference from the received power of the connected cell has been used as the "indicator regarding the interference from the adjacent cell", RS Received Quality (RSRQ) and Channel Quality Index (CQI) corresponding to a signal-to-noise-plus-interference ratio that are defined in LTE can be used instead.

Further, in the above example, although only the cell identifiers are sent as the "information regarding the interference from the adjacent cell", when the received power and the like corresponding to the cell identifiers are sent together with the cell identifiers, it is possible to determine more effective cell group and time pattern of the transmission power.

Furthermore, in the above example, although an example in which the "information regarding the interference from the adjacent cell" is used as the feedback information has been explained, the radio terminal 50 may send throughput information to the control apparatus 10.

Although in the above exemplary embodiments, the present invention has been explained in terms of a hardware configuration, the present invention is not limited to this. Processing by the control apparatus, the radio station, or the radio terminal can be realized by causing a CPU (Central Processing Unit) to execute a computer program.

In the above example, the program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (programmable ROM), EPROM (Erasable PROM), flash ROM, RAM (Random Access Memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Note that the present invention is not limited to the above-described embodiments, and modifications can be made as appropriate without departing from the scope thereof.

Although the present invention has been explained with reference to the exemplary embodiments, the present invention is not limited by above. Various modifications, obvious to those skilled in the art, can be made to the configurations and details of the present invention within the scope of the invention.

INDUSTRIAL APPLICABILITY

The present application is based upon and claims the benefit of priority from Japanese Patent Application No. 2013-196728, filed on Sep. 24, 2013, the entire contents of which are hereby incorporated by reference.

REFERENCE SIGNS LIST

1 RADIO STATION
2 RADIO STATION
3 RADIO STATION
4 RADIO STATION
5 RADIO STATION
6 RADIO STATION
10 CONTROL APPARATUS
11 BASE STATION
12 BASE STATION
13 BASE STATION
14 BASE STATION
15 BASE STATION
16 BASE STATION
21 TO 26 CELL
30 MACRO BASE STATION
32 TO 36 SMALL BASE STATION
41 MACRO CELL
42 TO 46 SMALL CELL
50 RADIO TERMINAL
110 PATTERN DETERMINING UNIT
120 COMMUNICATION UNIT

The invention claimed is:

1. A control apparatus disposed in a radio system including communication areas formed by a plurality of cells using the same frequency band, the control apparatus comprising:
at least one memory storing instructions, and
at least one processor configured to execute the instructions to:
define a cell group and determining a time pattern of transmission power, the cell group including one or more cells formed by a radio station, and the time pattern of the transmission power being set for each of a plurality of the cell groups; and
notify the radio station that forms a small cell added in association with a macro cell to which the radio terminal is firstly connected of the time pattern of the transmission power and a timing signal indicating a switching timing of the transmission power in the radio station when the radio terminal performs carrier aggregation for being connected to a plurality of the radio stations using cells that use a plurality of frequency bands at the same time, the radio station forming the one of more cells included in the cell group, wherein
the time pattern of the transmission power indicates that the transmission power is switched between maximum transmission power and transmission stop, and
a radio terminal is disconnected from the small cell during the time the transmission power is switched to transmission stop and then the radio terminal is connected to another small cell with a transmission power that is switched to maximum transmission power while the radio terminal is connected to the macro cell.

2. The control apparatus according to claim 1, wherein the timing signal includes a trigger signal that will be sent to the radio station at a timing of switching the transmission power in the radio station or a switching cycle signal that instructs the radio station to periodically switch the transmission power.

3. The control apparatus according to claim 1, wherein the at least one processor is configured to execute the instructions to determine or update at least one of the time pattern of the transmission power and the cells constituting the cell group according to at least one of information regarding throughput of a radio terminal camping on the one or more cells and information regarding interference from an adjacent cell.

4. The control apparatus according to claim 3, wherein the at least one processor is configured to execute the instructions to receive, from the radio terminal, the information regarding the interference from the adjacent cell when the interference from the adjacent cell on the radio terminal exceeds a predetermined level.

5. The control apparatus according to claim 4, wherein
the at least one processor is configured to execute the instructions to receive the information regarding the interference from the adjacent cell when received power in the cell on which the radio terminal camps is greater than or equal to a certain threshold.

6. The control apparatus according to claim 1, wherein
the at least one processor is configured to execute the instructions to notify the radio station of at least one of cell group information including an identifier of one of the cells constituting the cell group, a cell group pattern that is the time pattern of the cell group in which the transmission power is maximum in the cell group, and a cell pattern that is the time pattern of a cell to which the radio terminal is connected.

7. The control apparatus according to claim 1, wherein
a same cell identifier is used for a cell on which the radio terminal camps before the transmission power is switched and a cell on which the radio terminal will camp after the transmission power is switched that belongs to a cell group different from the cell group to which the cell on which the radio terminal camps before the transmission power is switched belongs.

8. The control apparatus according to claim 1, wherein
the time pattern of the transmission power indicates that the radio station sends or does not send a signal.

9. A radio station disposed in a radio system including communication areas formed by a plurality of cells using the same frequency band, the radio station comprising:
at least one memory storing instructions, and
at least one processor configured to execute the instructions to:
define a cell group and determine a time pattern of transmission power, the cell group including one or more cells formed by another radio station, and the time pattern of the transmission power being set for each of a plurality of the cell groups; and
notify the other radio station that forms a small cell added in association with a macro cell to which the radio terminal is firstly connected of the time pattern of the transmission power and a timing signal indicating a switching timing of the transmission power in the other radio station when the radio terminal performs carrier aggregation for being connected to a plurality of the radio stations using cells that use a plurality of frequency bands at the same time, the other radio station forming the one or more cells included in the cell group, wherein
the time pattern of the transmission power indicates that the transmission power in the other radio station is switched between maximum transmission power and transmission stop, and
a radio terminal is disconnected from the small cell during a time when a transmission power of the radio station is switched to transmission stop and then the radio terminal is connected to another small cell station when the transmission power of the other radio station is switched to maximum transmission power while the radio terminal is connected to the macro cell.

10. A radio terminal disposed in a radio system including communication areas formed by a plurality of cells using the same frequency band, the radio terminal executing:
a switching process of cells in which the radio terminal is disconnected from a radio station that forms a small cell added in association with a macro cell to which the radio terminal is firstly connected during a time when a transmission power of the radio station is switched to transmission stop and then the radio terminal is connected to another small cell with a transmission power that is switched to maximum transmission power while the radio terminal is connected to the macro cell according to a time pattern of transmission power and a timing signal in a cell group including one or more cells formed by the radio station, the time pattern of the transmission power being set for each of a plurality of the cell groups determined by a control apparatus, and the timing signal indicating a switching timing of the transmission power in the radio station.

11. The radio terminal according to claim 10, wherein
the radio terminal sends at least one of information regarding throughput in a cell on which the radio terminal currently camps and information regarding interference from an adjacent cell to the control apparatus in order to determine or update the time pattern of the transmission power by the control apparatus.

12. A radio system including communication areas formed by a plurality of cells using the same frequency band, the radio system comprising:
a control apparatus comprising:
at least one memory storing instructions, and
at least one processor configured to execute the instructions to:
define a cell group and determining a time pattern of transmission power, the cell group including one or more cells formed by a radio station, and the time pattern of the transmission power being set for each of a plurality of the cell groups; and
notify the radio station that forms a small cell added in association with a macro cell to which the radio terminal is firstly connected of the time pattern of the transmission power and a timing signal indicating a switching timing of the transmission power in the radio station when the radio terminal performs carrier aggregation for being connected to a plurality of the radio stations using cells that use a plurality of frequency bands at the same time, the radio station forming the cell included in the cell group;
the radio station, wherein the radio station is configured to switch transmission power of a signal in a cell formed by the radio station according to the time pattern of the transmission power and the timing signal that have been sent, the signal being sent to a camping cell; and
a radio terminal that is configured to execute a switching process of a cell in which the radio terminal is disconnected from the small cell during the time the transmission power is switched to transmission stop and then the radio terminal is connected to another small cell with a transmission power that is switched to maximum transmission power when the transmission power of the signal sent from the radio station is switched while the radio terminal is connected to the macro cell.

13. A control method used by a control apparatus disposed in a radio system including communication areas formed by a plurality of cells using the same frequency band, the control method comprising:
defining a cell group and determining a time pattern of transmission power, the cell group including one or more cells formed by a radio station, the time pattern of the transmission power being set for each of a plurality of the cell groups; and
notifying the radio station that forms a small cell added in association with a macro cell to which the radio terminal is firstly connected of the time pattern of the transmission power and a timing signal indicating a switching timing of the transmission power in the radio station when the radio terminal performs carrier aggregation for being connected to a plurality of the radio stations using cells that use a plurality of frequency bands at the same time, the radio station forming the one or more cells included in the cell group, wherein the time pattern of the transmission power indicates that the transmission power is switched between maximum transmission power and transmission stop and a radio terminal is disconnected from the small cell during the time the transmission power is switched to transmission stop and then the radio terminal is connected to another small cell with a transmission power that is switched to maximum transmission power while the radio terminal is connected to the macro cell.

14. A non-transitory computer readable medium storing a program that causes a computer of a control apparatus disposed in a radio system including communication areas formed by a plurality of cells using the same frequency band to:

define a cell group and determine a time pattern of transmission power, the cell group including one or more cells formed by a radio station, and the time pattern of the transmission power being set for each of a plurality of the cell groups; and notify the radio station that forms a small cell added in association with a macro cell to which the radio terminal is firstly connected of the time pattern of the transmission power and a timing signal indicating a switching timing of the transmission power in the radio station when the radio terminal performs carrier aggregation for being connected to a plurality of the radio stations using cells that use a plurality of frequency bands at the same time, the radio station forming the one or more cells included in the cell group, wherein the time pattern of the transmission power indicates that the transmission power is switched between maximum transmission power and transmission stop and a radio terminal is disconnected from the small cell during the time the transmission power is switched to transmission stop and then the radio terminal is connected to another small cell with a transmission power that is switched to maximum transmission power.

* * * * *